United States Patent [19]

Hara

[11] Patent Number: 4,832,197

[45] Date of Patent: May 23, 1989

[54] PHOTOSENSITIVE MATERIAL MAGAZINE

[75] Inventor: Hiroshi Hara, Kanagawa, Japan

[73] Assignee: Fuji Photo Film Co., Ltd., Kanagawa, Japan

[21] Appl. No.: 117,782

[22] Filed: Nov. 6, 1987

[30] Foreign Application Priority Data

Nov. 7, 1986 [JP] Japan ................................. 61-264071

[51] Int. Cl.⁴ ..................... B65D 81/30; B65D 85/671
[52] U.S. Cl. .................................. 206/409; 242/71.1;
242/75.4; 354/275; 355/72
[58] Field of Search ................... 206/389, 408–410;
242/55.53, 68, 71.1, 75.4; 354/275; 355/72

[56] References Cited

U.S. PATENT DOCUMENTS

| | | | |
|---|---|---|---|
| 959,781 | 5/1910 | Moyer | 242/55.53 |
| 1,685,802 | 10/1928 | Bornmann | 242/71.1 |
| 3,645,385 | 2/1972 | Bushnell | 242/71.1 |
| 3,690,582 | 9/1972 | Duvall | 242/71.1 |
| 4,027,795 | 6/1977 | Rigden | 206/409 |
| 4,395,107 | 7/1983 | Lührig et al. | 242/71.1 |
| 4,403,845 | 9/1983 | Buelens et al. | 354/275 |
| 4,576,279 | 3/1986 | Ferderber | 206/409 |
| 4,756,418 | 7/1988 | Johanson et al. | 354/275 |

Primary Examiner—Jimmy G. Foster
Attorney, Agent, or Firm—Sughrue, Mion, Zinn, Macpeak & Seas

[57] ABSTRACT

A magazine for belt-shaped photosensitive material in which the photosensitive material is in the form of a roll and is rotatably supported by a casing of the magazine. The photosensitive material is pulled through a slot formed in the casing and a small tab piece is attached to at least one of two lateral edges of the photosensitive material so that the small piece protrudes in the widthwise direction of the photosensitive material. The sum of the length of the protruding small piece and the width of the photosensitive material is larger than the length of the slot. A leading end protector is detachably mounted to the casing. The protector extends along the widthwise direction along the front end portion of the photosensitive material and prevents the front end portion from being bent or deformed.

5 Claims, 1 Drawing Sheet

FIG. 1
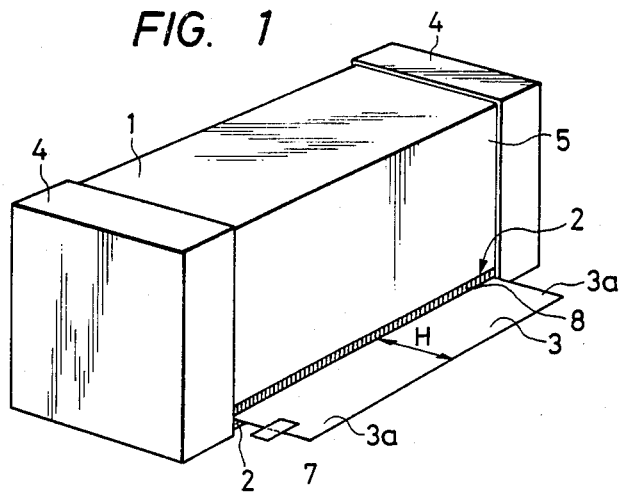
FIG. 2(a)    FIG. 2(b)    FIG. 2(c)
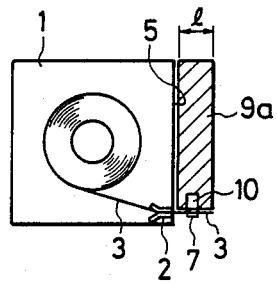 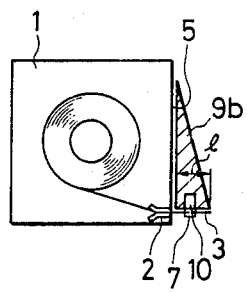 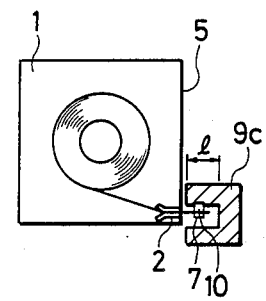
FIG. 3
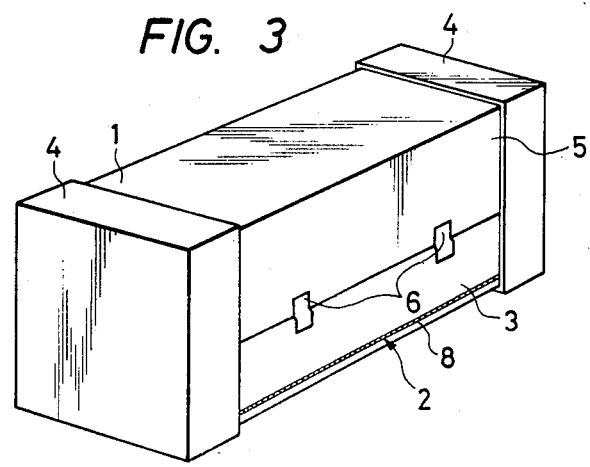

PHOTOSENSITIVE MATERIAL MAGAZINE

BACKGROUND OF THE INVENTION

1. Field of the Invention

This invention relates to magazines for belt-shaped photosensitive materials (hereinafter referred to as "photosensitive material magazines", when applicable), and more particularly to a photosensitive material magazine for printing, copying and so forth.

2. Description of the Prior Art

Presently, there are available a variety of photosensitive material magazines of different configuration for holding a relatively wide, belt-shaped photosensitive material used for printing, copying and so forth. One example of these photosensitive material magazines is shown in FIG. 3 (cf. Japanese patent application publication No. 36736/1984 for instance). The magazine comprises: a four sided prism-shaped hollow body 1 which has a square cross-section; and two end caps 4 fitted on both ends of the body 1. A roll of photosensitive material 3 is held in the casing formed by the hollow body 1 and the end caps 4 so that it is shielded from exposure to light. The photosensitive material 3 is pulled out through a slot 2 having a light shielding means, and which is formed in one of the sides of the hollow body 1 so that it extends along the axis of a winding core 5 of the roll of photosensitive material 3 in the magazine.

The material of the hollow body 1 is, for instance, corrugated fiberboard, cardboard or plastic material. The two caps 4 which seal closed both ends of the hollow body 1 have grooves which engage with the edges of the ends of the hollow body 1 so that the photosensitive material is shielded from light, and also have bearings for supporting the rotary shaft of the winding core 5 of the roll of photosensitive material. As a result, the magazine is relatively intricate in configuration, and must have high rigidity and accurate dimensions. Therefore, the magazine is generally made of plastic material.

The roll of photosensitive material 3 is inserted in the magazine with the front end portion pulled out of the magazine slightly through the slot 2. The front end portion thus pulled out is fastened to the body 1 of the magazine, for instance, with pieces of adhesive tape 6 so that it may not be rewound back into the magazine.

When the magazine is loaded in the magazine loading section of an image forming device or the like, the adhesive tapes 6 are removed from the front end portion of the photosensitive material, and then the front end portion is clamped, for instance, by the conveying nip rollers of the image forming device, so that the photosensitive material may be pulled out.

In the conventional photosensitive material magazine, as is apparent from FIG. 3, the edge of the slot 2 is substantially at right angles to the surface of the magazine to which the front end portion is taped. Therefore, the photosensitive material 3 is bent by the edge of the slot 2 while it is being stored or transported, i.e., before it is actually used. Because a portion of the photosensitive material 3 is bent, the remaining photosensitive material 3 may not be clamped by the conveying nip rollers; that is, sometimes it cannot be satisfactorily pulled out of the magazine. Accordingly, it is necessary to cut away the bent portion from the photosensitive material before the magazine is loaded in the magazine loading section. After the bent part has been cut away, it is necessary to pull out the photosensitive material by a predetermined length. This process is uneconomical, and troublesome in operation.

SUMMARY OF THE INVENTION

Accordingly, an object of this invention is to eliminate the above-described difficulties accompanying a conventional photosensitive material magazine. More specifically, an object of the invention is to provide an economical photosensitive material magazine in which it is unnecessary to cut away a bent portion of the photosensitive material, i.e., the photosensitive material can be used economically, and can be handled readily.

The foregoing object of the invention has been achieved by the provision of a photosensitive material magazine which is designed so that a belt-shaped photosensitive material wound in the form of a roll and rotatably supported in a casing is pulled out through a slot formed in the casing; in which, according to the invention, a small piece is attached to at least one of two lateral edges of the photosensitive material that is pulled out through the slot, so that the small piece protrudes in the widthwise direction of the photosensitive material and the sum of the length of protrusion of the small piece and the width of the photosensitive material is larger than the length of the slot.

The photosensitive material magazine's hollow body is made of cardboard, corrugated fiberboard or plastic material. In the case where corrugated fiberboard or cardboard is used, the hollow body is formed by a folding method. In the case where plastic material is employed, it is formed by a special die extrusion molding method or folding method. It is preferably that, as in the conventional photosensitive material magazine, the two end caps for sealing closed both ends of the hollow body are made of plastic material in view of the necessary machining accuracy.

In the photosensitive material magazine of the invention, the light shielding means for the slot may be teremp or plush glued to the lips of the slot; however, the invention is not limited thereto or thereby.

In the invention, the photosensitive material may be either an ordinary wet process type photosensitive material or a thermal developing photosensitive material. That is, it includes not only silver salt photosensitive materials but also other photosensitive materials such as photographic films and printing sheets.

BRIEF DESCRIPTION OF THE DRAWINGS

FIG. 1 is a perspective view showing one example of a photosensitive material magazine according to this invention.

FIGS. 2(a)-2(c) are sectional diagrams showing methods of protecting the front end portion of a belt-shaped photosensitive material which is pulled out of the magazine.

FIG. 3 is a perspective view showing one example of a conventional photosensitive material magazine.

DESCRIPTION OF THE PREFERRED EMBODIMENTS

An embodiment of this invention will be described with reference to the accompanying drawings.

In the photosensitive material magazine of the invention, the length of the front end portion of the photosensitive material, shown as H in FIG. 1, which is to be pulled out is not particularly limited. However, the length H of the front end portion should be such that the photosensitive material can be readily pulled out and will not be rewound back into the magazine. That is, it is desirable that the length of the front end portion be large enough to permit the automatic pull-out of the photosensitive material, in compliance with the magazine loading section.

In the photosensitive material magazine of the invention, as shown in FIG. 1, a small piece 7 is provided on a lateral edge 3a of the front end portion of the belt-shaped photosensitive material 3 so that it protrudes outward from the photosensitive material 3. More specifically, the small piece 7, such as a piece of adhesive tape, is glued to at least one of the two lateral (right and left) edges of the front end portion of the photosensitive material in such a manner that it protrudes beyond the width of the slot 2. Accordingly, at the position where the small piece 7 is located, the length of the small piece is added to the width of the photosensitive material. Hereinafter the sum of these values will be referred to as "the total width", when applicable.

The small piece 7 may be made of adhesive tape as described above, or it may be a plastic piece secured by an adhesive. The small piece 7 should be thick and hard enough to serve as a stopper when it strikes against the side of the hollow body 1 at the end of slot 2. Furthermore, the small piece 7 should be readily removable if inadvertently stuck on other parts during storage or when the magazine is loaded in the exposing unit.

The short length of photosensitive material 3 pulled out of the magazine should be maintained or stored as it is. However, in the case where there is a danger of it being damaged or bent by other objects, a protector 9a, 9b or 9c, as shown in FIG. 2 may be detachably mounted to the hollow body 1.

FIG. 2 is a sectional view of the photosensitive material magazine according to the invention. The front end portion of the photosensitive material 3 in the form of a roll is pulled out of the magazine through the slot 2. The protectors 9a, 9b and 9c are mounted on the surface 5 of the hollow body 1 so that each overhangs the front end portion in the widthwise direction of the photosensitive material, thereby protecting the front end portion of the photosensitive material.

The protector 9a shown in part (a) of FIG. 2 is in the form of a quadrangular prism, the protector 9b in part (b) of FIG. 2 is in the form of a triangular prism, and the protector 9c in part (c) of FIG. 2 is U-shaped in section. The present invention is not limited to the three protectors 9a, 9b and 9c, but rather the protector may have any configuration so long as it can protect the front end portion of the photosensitive sheet and is convenient for the packaging, storing or handling of the magazine.

The small piece 7 may remain outside the width of the slot 2, as it is. However, the front end portion of the photosensitive material may be bonded to the protector 9a, 9b or 9c with a piece of tape 10.

The dimension (1) of the protector 9a, 9b or 9c shown in FIG. 2 is preferably equal to or larger than the length of the part of the photosensitive material 3 which is pulled out of the magazine; however, it is not limited thereto. That is, even if the dimension (1) of the protector 9a, 9b or 9c is smaller than the length of the part pulled out, depending on the rigidity of the photosensitive material, the front end portion of the photosensitive material 3 may not be bent or deformed. Thus, the dimension (1) can be set to a suitable value as the case may be.

In the photosensitive material magazine of the present invention, as described above, the small piece 7 prevents the rewinding of the photosensitive material. Furthermore, in handling the magazine, the protector 9a, 9b or 9c will prevent the front end portion of the photosensitive material from being damaged or deformed. Setting the dimension H of the front end portion of the photosensitive material 3 which is pulled out the magazine to a value which is required when the magazine is loaded in the image forming device can eliminate the troublesome operation accompanying the conventional magazine, in which the front end portion of the photosensitive material is cut away, and the length of the photosensitive material pulled out of the magazine is adjusted.

While the invention has been described with respect to a photosensitive material magazine which is in the form of a rectangular prism, the invention is not limited thereto or thereby; that is, the technical concept of the invention is equally applicable to a cylindrical photosensitive material magazine as well as other geometric shapes.

As was described above, in a photosensitive material magazine accommodating a belt-shaped photosensitive material wound in the form of a roll, according to the invention a small tab is attached to the lateral edge of the photosensitive material pulled out of the magazine. This prevents the photosensitive material from being rewound back into the magazine without fastening the front end of the latter to the wall of the magazine, and thus prevents the front end portion of the photosensitive material from being bent by the edge of the slot. The protector located near the slot prevents the front end portion from being bent or deformed, and can hold the front end portion straight. Accordingly, it is unnecessary to cut away the front end portion of the photosensitive material or to adjust the length thereof. Thus, the photosensitive material magazine according to the invention is excellent both in economical use and in operability.

What is claimed is:

1. A photosensitive material magazine comprising:
    a casing;
    a belt-shaped photosensitive material wound in the form of a roll and rotatably supported in said casing;
    a slot formed in a side of said casing through which said photosensitive material is pulled out;
    light-shielding means attached to said slot for preventing exposure of said photosensitive material to light;
    a tab means attached to at least one of two lateral edges of a length of said photosensitive material pulled out through said slot;
    said tab means protruding in the widthwise direction of said photosensitive material such that the sum of the length of the protrusion of said tab means and the width of said photosensitive material is larger than the length of said slot, thus preventing said belt-shaped photosensitive material from rewinding.

2. A photosensitive material magazine as claimed in claim 1 further comprising:
    a protector for protecting the front end portion of said length of photosensitive material which is pulled out through said slot;
    said protector being detachably mounted on said casing and extending in said widthwise direction along said front end portion of said length of photosensitive material.

3. A photosensitive material magazine as claimed in claim 2 wherein said protector is in the shape of a quadrangular prism.

4. A photosensitive material magazine as claimed in claim 2 wherein said protector is in the shape of a trirangular prism.

5. A photosensitive material magazine as claimed in claim 2 wherein said protector is in the shape of a U-shaped channel.

* * * * *